US012560845B2

(12) United States Patent　　　(10) Patent No.:　US 12,560,845 B2
Song et al.　　　　　　　　　　　(45) Date of Patent:　　Feb. 24, 2026

(54) LIQUID CRYSTAL DISPLAY PANEL, MANUFACTURING METHOD THEREOF, AND LIQUID CRYSTAL DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Liwang Song, Shenzhen (CN); Lai Xie, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 387 days.

(21) Appl. No.: 18/272,860

(22) PCT Filed: Jun. 29, 2023

(86) PCT No.: PCT/CN2023/104266
§ 371 (c)(1),
(2) Date: Jul. 18, 2023

(87) PCT Pub. No.: WO2024/250361
PCT Pub. Date: Dec. 12, 2024

(65) Prior Publication Data
US 2025/0093716 A1　Mar. 20, 2025

(30) Foreign Application Priority Data
Jun. 9, 2023　(CN) ......................... 202310682437.7

(51) Int. Cl.
G02F 1/1362　　(2006.01)
G02F 1/1368　　(2006.01)

(52) U.S. Cl.
CPC .. G02F 1/136263 (2021.01); G02F 1/136213 (2013.01); G02F 1/136286 (2013.01); G02F 1/1368 (2013.01)

(58) Field of Classification Search
CPC ......... G02F 1/136263; G02F 1/136213; G02F 1/136286; G02F 1/1368; G02F 1/134345; G02F 1/13624; G02F 1/1362
See application file for complete search history.

(56) References Cited

FOREIGN PATENT DOCUMENTS

| CN | 111474780 A | 7/2020 |
| CN | 111665670 A | 9/2020 |
| (Continued) | | |

OTHER PUBLICATIONS

CN114415434A machine translation (Year: 2022).*
(Continued)

*Primary Examiner* — James R Greece
*Assistant Examiner* — Jose M Diaz
(74) *Attorney, Agent, or Firm* — The Roy Gross Law Firm, LLC; Roy D. Gross

(57) ABSTRACT

The present disclosure provide a liquid crystal display panel, a manufacturing method thereof, and a liquid crystal display device. In the liquid crystal display panel, a projection of the pull-down signal line on the substrate is spaced apart from a projection of any wiring in the gate layer on the substrate, so that no other metal is placed under the pull-down signal line, and the thickness of the photoresist on the pull-down signal line can be increased accordingly, thus the width of the pull-down signal line can be increased, and disconnection and failure of the pull-down signal line can be avoided.

20 Claims, 6 Drawing Sheets

(56)      References Cited

FOREIGN PATENT DOCUMENTS

| CN | 113311624 A | 8/2021 |
| CN | 114415434 A | 4/2022 |
| CN | 114489379 A | 5/2022 |

OTHER PUBLICATIONS

Chinese Office Action issued in corresponding Chinese Patent Application No. 202310682437.7 dated Jul. 15, 2023, pp. 1-8, 18pp.
Chinese Office Action issued in corresponding Chinese Patent Application No. 202310682437.7 dated Aug. 4, 2023, pp. 1-5, 10pp.

* cited by examiner

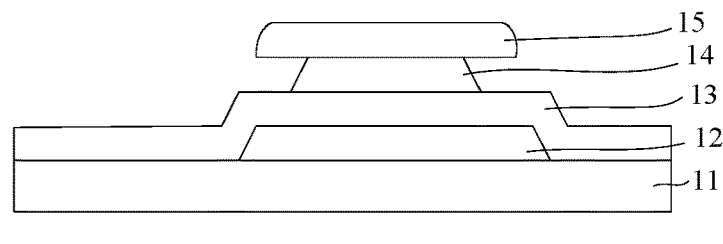
FIG. 1
2
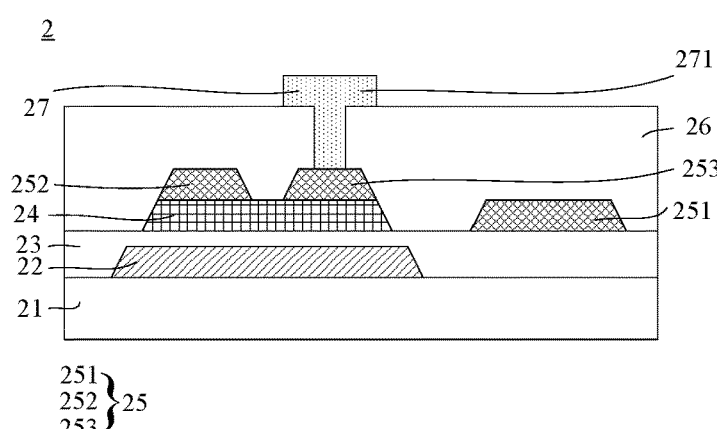
FIG. 2
2
FIG. 3

L5

271b

271a

271

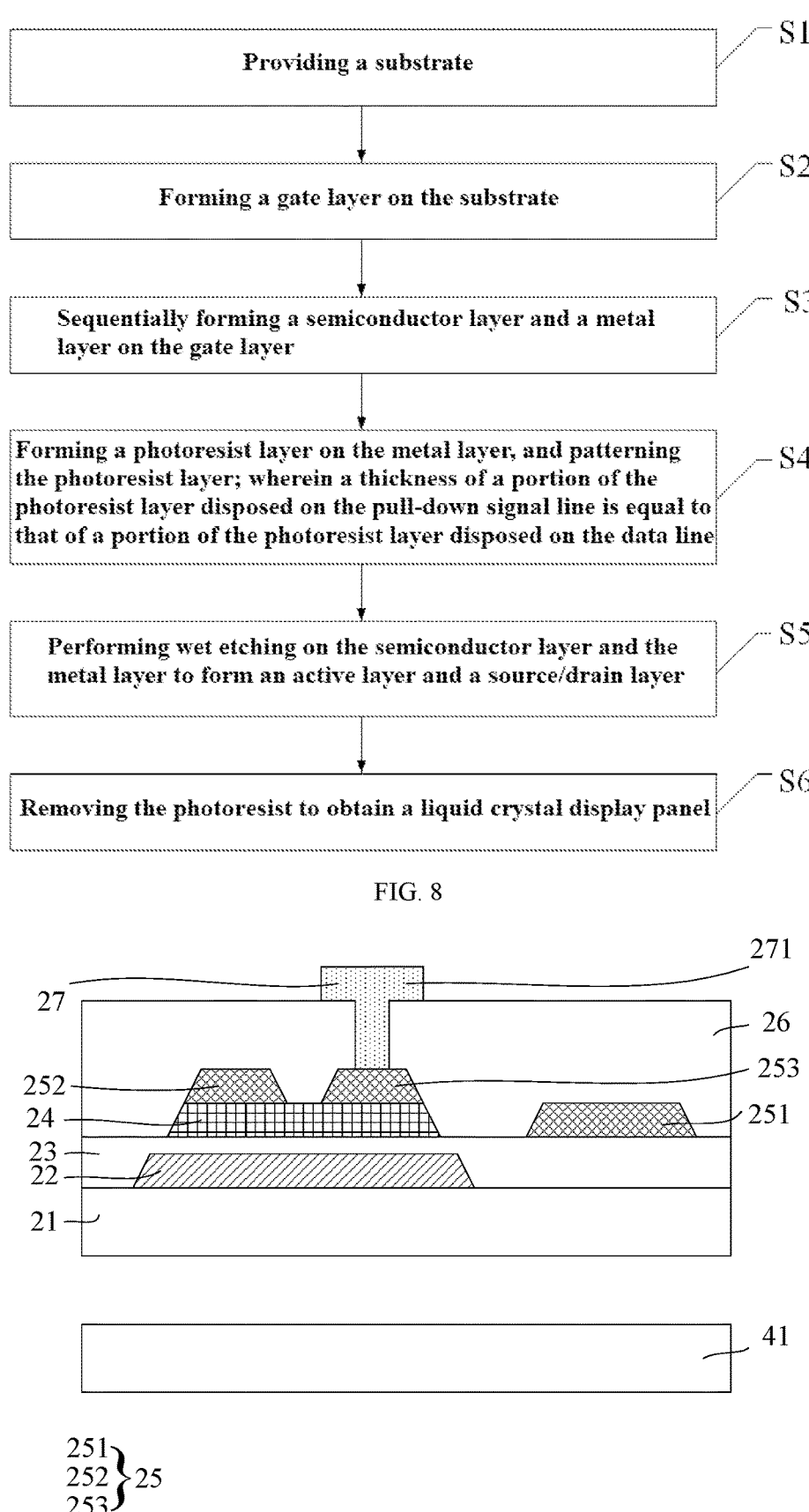

Providing a substrate — S1

Forming a gate layer on the substrate — S2

Sequentially forming a semiconductor layer and a metal layer on the gate layer — S3

Forming a photoresist layer on the metal layer, and patterning the photoresist layer; wherein a thickness of a portion of the photoresist layer disposed on the pull-down signal line is equal to that of a portion of the photoresist layer disposed on the data line — S4

Performing wet etching on the semiconductor layer and the metal layer to form an active layer and a source/drain layer — S5

Removing the photoresist to obtain a liquid crystal display panel — S6

LIQUID CRYSTAL DISPLAY PANEL, MANUFACTURING METHOD THEREOF, AND LIQUID CRYSTAL DISPLAY DEVICE

CROSS REFERENCE TO RELATED APPLICATIONS

This application is a National Phase of PCT Patent Application No. PCT/CN2023/104266 having International filing date of Jun. 29, 2023, which claims the benefit of priority of Chinese Patent Application No. 202310682437.7, filed Jun. 9, 2023, the contents of which are all incorporated herein by reference in their entirety.

TECHNICAL FIELD

The present disclosure relates to the field of display technology, in particular, to a liquid crystal display panel, a manufacturing method thereof, and a liquid crystal display device.

BACKGROUND

Thin film transistor-liquid crystal display (TFT-LCD) is widely used due to its long life, mature technology and low price. In order to solve the problem of color shift in existing liquid crystal display devices, a light-emitting area of a sub-pixel is divided into a main pixel area and a secondary pixel area. Further, the voltage of the vice pixel area is lowered through a pull-down unit, so that the voltages of the main pixel area and the vice pixel area are inconsistent, thereby improving the color shift. Meanwhile, in order to improve the manufacturing efficiency, a source/drain layer and an active layer are etched through one-time wet etching process during the manufacturing of the existing liquid crystal display devices. However, due to large height of the pull-down unit, the photoresist on the pull-down unit is relatively thin, and the problem of the photoresist peeling from the pull-down unit is easy to occur when wet etching the source/drain layer and the active layer, which in turn leads to the problem that the etching solution directly etches the pull-down unit and the pull-down unit has a problem of disconnection and failure, resulting in abnormal display of the liquid crystal display device.

Therefore, the photoresist on the pull-down unit is easily peeled off in the existing liquid crystal display devices, which leads to the technical problem that the pull-down unit is directly etched by the etching solution, and has a disconnection and failure.

SUMMARY OF INVENTION

An embodiment of the present disclosure provides a liquid crystal display panel, a manufacturing method thereof, and a liquid crystal display device, so as to alleviate the problem that photoresist on the pull-down unit in the existing liquid crystal display devices is easily peeled off, causing the pull-down unit to be directly etched by the etching solution, and resulting in disconnection and failure.

To solve the above problems, the present disclosure provides the following technical solutions:

Embodiments of the present disclosure provide a liquid crystal display panel. The liquid crystal display panel comprises a plurality of scanning lines and a plurality of data lines. The plurality of scanning lines and the plurality of data lines define a plurality of sub-pixel units, and at least one of the sub-pixel units connects one of the plurality of scanning lines and one of the plurality of data lines. Each of the sub-pixel units includes:
  a main sub-pixel unit including a first transistor;
  a secondary sub-pixel unit comprising a second transistor and a third transistor; and
  a pull-down signal line connected to the third transistor.
  The liquid crystal display panel further includes a substrate and a gate layer, and a projection of the pull-down signal line on the substrate is spaced apart from a projection of any wiring in the gate layer on the substrate.

In some embodiments, the pull-down signal line includes a first portion and a second portion, one of the first portion and the second portion is disposed corresponding to the main sub-pixel unit, and another of the first portion and the second portion is disposed corresponding to the secondary sub-pixel unit. The liquid crystal display panel further includes a connection line, the first portion and the second portion are connected by the connection line, and the connection line is connected with the third transistor.

In some embodiments, the first portion is disposed corresponding to the main sub-pixel unit, the second portion is disposed corresponding to the secondary sub-pixel unit, and a width of the first portion is greater than that of the second portion.

In some embodiments, a width of the first portion is equal to that of the second portion, and the width of the first portion is greater than or equal to a width of the connection line.

In some embodiments, a width of the pull-down signal line is equal to that of the data line.

In some embodiments, the liquid crystal display panel further includes a gate insulating layer disposed on one side of the gate layer away from the substrate, wherein the gate insulating layer is in direct contact with the substrate in an area corresponding to the pull-down signal line.

In some embodiments, the liquid crystal display panel further includes:
  a source/drain layer disposed on one side of the gate insulating layer away from the substrate, wherein the source/drain layer includes a pull-down signal line; and
  a pixel electrode layer disposed on one side of the source/drain layer away from the gate insulating layer, the pixel electrode layer comprising a plurality of pixel electrodes;
  Each of the plurality of pixel electrode includes a main trunk electrode and a plurality of branch electrodes, wherein the projection of the pull-down signal line on the substrate coincides with the projection of the main trunk electrode on the substrate, and the width of the pull-down signal line is less than or equal to that of the main trunk electrode.

In some embodiments, the main sub-pixel unit further includes a first storage capacitor, the secondary sub-pixel unit further comprises a second storage capacitor, a first plate of the first storage capacitor is connected with the second transistor, a second plate of the first storage capacitor is connected with a common signal line, a first plate of the second storage capacitor is connected with the third transistor, and a second plate of the second storage capacitor is connected with the common signal line.

In some embodiments, gates of the first transistor, the second transistor, and the third transistor are connected with the plurality of scanning lines, a first electrode of the first transistor and a first electrode of the second transistor are connected with the plurality of data lines, a second electrode of the first transistor is connected with the first storage capacitor, a second electrode of the second transistor is connected with a first electrode of the third transistor, and a second electrode of the third transistor is connected with the pull-down signal line.

In some embodiments, the main sub-pixel unit further includes a first liquid crystal capacitor, the secondary sub-pixel unit further includes a second liquid crystal capacitor, a first plate of the first liquid crystal capacitor is connected with a second electrode of the first transistor, a second plate of the first liquid crystal capacitor is connected with a common electrode line, a first plate of the second liquid crystal capacitor is connected with a second electrode of the second transistor, and a second plate of the second liquid crystal capacitor is connected with the common electrode line.

Meanwhile, embodiments of the present disclosure provide method for manufacturing a liquid crystal display panel, wherein the method is used for preparing the liquid crystal display panel according to any one of the above embodiments, and the method for manufacturing a liquid crystal display panel includes:

providing a substrate;

forming a gate layer on the substrate;

sequentially forming a semiconductor layer and a metal layer on the gate layer;

forming a photoresist layer on the metal layer, and patterning the photoresist layer; wherein a thickness of a portion of the photoresist layer located on the pull-down signal line is equal to that of a portion of the photoresist layer located on the data line;

performing wet etching on the semiconductor layer and the metal layer to form an active layer and a source/drain layer; and removing the photoresist to obtain a liquid crystal display panel.

Meanwhile, embodiments of the present disclosure provide a liquid crystal display device including a liquid crystal display panel including a plurality of scanning lines and a plurality of data lines. The plurality of scanning lines and the plurality of data lines defines a plurality of sub-pixel units, and at least one of the sub-pixel units connects one of the plurality of scanning lines and one of the plurality of data lines. Each of the sub-pixel units includes:

a main sub-pixel unit including a first transistor;

a secondary sub-pixel unit including a second transistor and a third transistor;

a pull-down signal line connected to the third transistor;

The liquid crystal display panel further includes a substrate and a gate layer, and a projection of the pull-down signal line on the substrate is spaced apart from a projection of any wiring in the gate layer on the substrate.

In some embodiments, the pull-down signal line includes a first portion and a second portion, one of the first portion and the second portion is disposed corresponding to the main sub-pixel unit, and another of the first portion and the second portion is disposed corresponding to the secondary sub-pixel unit. The liquid crystal display panel further includes a connection line, the first portion and the second portion are connected by the connection line, and the connection line is connected with the third transistor.

In some embodiments, the first portion is disposed corresponding to the main sub-pixel unit, the second portion is disposed corresponding to the secondary sub-pixel unit, and a width of the first portion is greater than that of the second portion.

In some embodiments, a width of the first portion is equal to that of the second portion, and the width of the first portion is greater than or equal to a width of the connection line.

In some embodiments, a width of the pull-down signal line is equal to that of the data line.

In some embodiments, the liquid crystal display panel further includes a gate insulating layer disposed on one side of the gate layer away from the substrate, and the gate insulating layer is in direct contact with the substrate in an area corresponding to the pull-down signal line.

In some embodiments, the liquid crystal display panel further includes:

a source/drain layer disposed on one side of the gate insulating layer away from the substrate, wherein the source/drain layer includes a pull-down signal line; and a pixel electrode layer disposed on one side of the source/drain layer away from the gate insulating layer, wherein the pixel electrode layer includes a plurality of pixel electrodes.

Each of the plurality of pixel electrode includes a main trunk electrode and a plurality of branch electrodes, the projection of the pull-down signal line on the substrate coincides with the projection of the main trunk electrode on the substrate, and the width of the pull-down signal line is less than or equal to that of the main trunk electrode.

In some embodiments, the main sub-pixel unit further includes a first storage capacitor, the secondary sub-pixel unit further includes a second storage capacitor, a first plate of the first storage capacitor is connected with the second transistor, a second plate of the first storage capacitor is connected with a common signal line, a first plate of the second storage capacitor is connected with the third transistor, and a second plate of the second storage capacitor is connected with the common signal line.

In some embodiments, gates of the first transistor, the second transistor, and the third transistor are connected with the plurality of scanning lines, a first electrode of the first transistor and a first electrode of the second transistor are connected with the plurality of data lines, a second electrode of the first transistor is connected with the first storage capacitor, a second electrode of the second transistor is connected with a first electrode of the third transistor, and a second electrode of the third transistor is connected with the pull-down signal line.

Advantageous Effects

The present disclosure provides a liquid crystal display panel, a manufacturing method thereof, and a liquid crystal display device. The liquid crystal display panel includes a plurality of scanning lines and a plurality of data lines. The plurality of scanning lines and the plurality of data lines define a plurality of sub-pixel units, wherein at least one of the sub-pixel units connects one of the plurality of scanning lines and one of the plurality of data lines. Each of the sub-pixel units includes a main sub-pixel unit, a secondary sub-pixel unit and a pull-down signal line. The main sub-pixel unit includes a first transistor. The secondary sub-pixel unit includes a second transistor and a third transistor. The pull-down signal line is connected to the third transistor. The liquid crystal display panel further includes a substrate and a gate layer, and a projection of the pull-down signal line on the substrate is spaced apart from a projection of any wiring in the gate layer on the substrate. In the present disclosure, a projection of the pull-down signal line on the substrate is spaced apart from a projection of any wiring in the gate layer on the substrate, so that no other metal is placed under the pull-down signal line. When the liquid crystal display panel is manufactured, the thickness of the photoresist on the pull-down signal line is similar to or even equal to that of the photoresist in other areas, which enhances the adhesion of the photoresist on the pull-down signal line and prevents the photoresist on the pull-down signal line from being peeled off, thereby protecting the pull-down signal line, and avoiding disconnection and failure of the pull-down signal line. Moreover, since metals placed under the pull-down signal line are removed, the width of the pull-down signal line can be correspondingly increased, further avoiding the disconnection of the pull-down signal line, reducing the impedance of the pull-down signal line, reducing the power consumption of the liquid crystal display panel, and improving the display uniformity of the liquid crystal display panel.

DESCRIPTION OF THE DRAWINGS

The technical solutions and other beneficial effects of the present disclosure will be apparent from the detailed description of specific embodiments of the present disclosure with reference to the accompanying drawings FIG. 1 is a schematic diagram of an existing liquid crystal display device.

FIG. 2 is circuit diagram of a liquid crystal display panel according to an embodiment of the present disclosure; and FIG. 3 is a first schematic diagram of a liquid crystal display panel according to an embodiment of the present disclosure.

FIG. 8 is a flowchart of a method for manufacturing a liquid crystal display panel according to an embodiment of the present disclosure.

FIG. 9 is a schematic diagram of a liquid crystal display device according to an embodiment of the present disclosure.

EMBODIMENTS OF INVENTION

Hereinafter, technical solutions in embodiments of the present disclosure will be clearly and completely described with reference to the accompanying drawings in embodiments of the present disclosure. Apparently, the described embodiments comprise but are not limited to the embodiments of the present disclosure. Other embodiments that can be obtained by a person with ordinary skill in the art on the basis of the embodiments in the present disclosure without creative labor belong to the protection scope of the present disclosure.

As shown in FIG. 1, an existing liquid crystal display device includes a substrate 11, a gate layer, a gate insulating layer 13, an active layer, and a source/drain layer. In order to improve the manufacturing efficiency, a source/drain layer and an active layer are etched through one-time wet etching process during the manufacturing of the existing liquid crystal display devices. However, since a metal line 12 is placed under the pull-down unit 14, the pull-down unit 14 there has a large height, resulting in a relatively thin photoresist 15 on the pull-down unit 14. Under a fixed exposure dose, the width of the photoresist 15 on the pull-down unit 14 is small, resulting in a small line width of the pull-down unit 14. The problem of photoresist 15 on the pull-down unit 14 peeling off is easy to occur when the source/drain layer and the active layer are subjected to wet etching, which in turn leads to the problem that the etching solution directly etches the pull-down unit 14 and the pull-down unit 14 has a problem of disconnection and failure. In addition, in order to make the thickness of the source/drain layer and the active layer reach the target thickness, the etching time will be increased, which will lead to disconnection and failure of the pull-down unit 14, resulting in obvious abnormality of the liquid crystal display device. Therefore, the photoresist on the pull-down unit is easily peeled off in the existing liquid crystal display devices, which leads to the technical problem that the pull-down unit is directly etched by the etching solution, and has a disconnection and failure.

Figure 4:
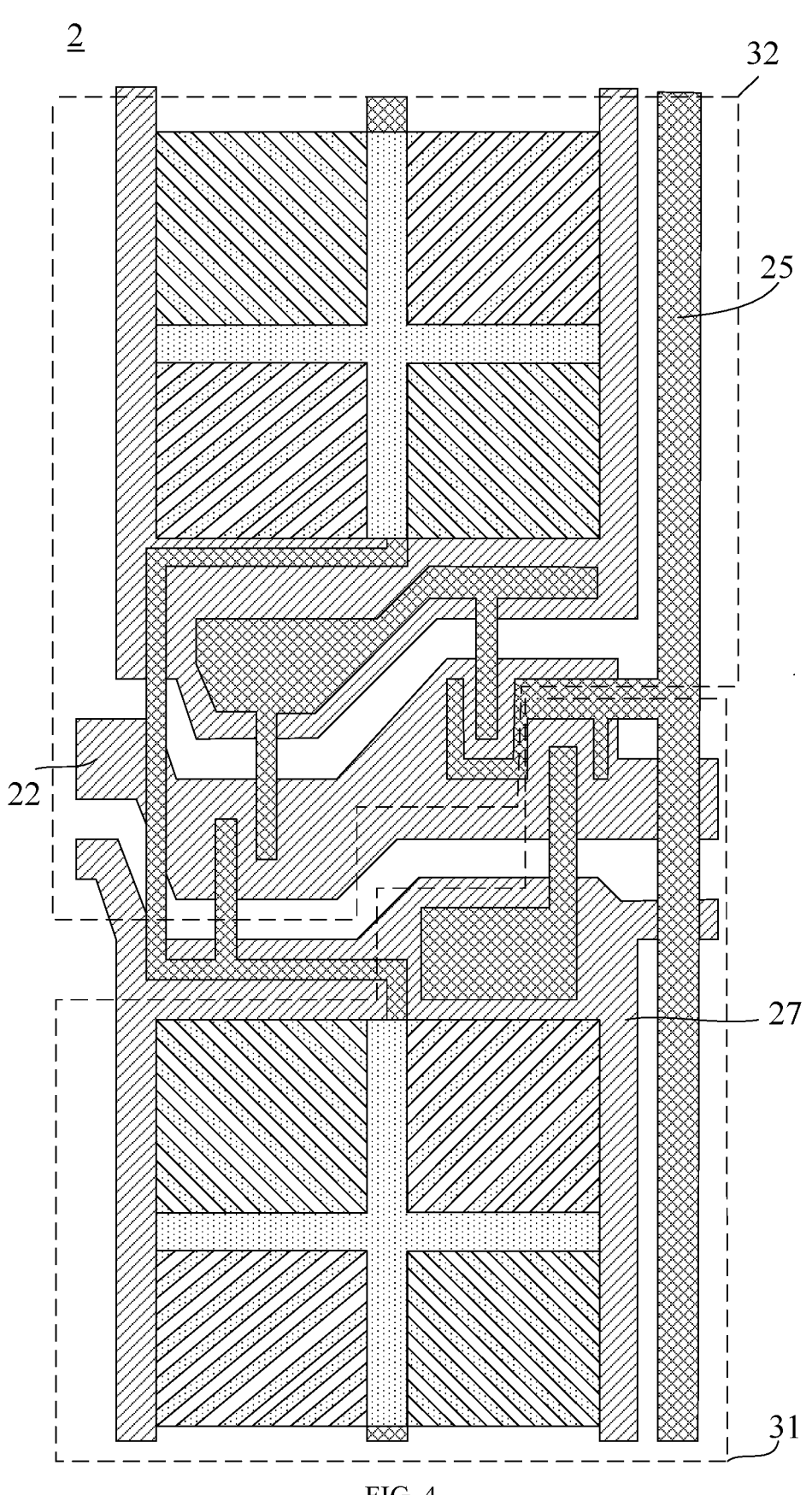
FIG. 4 is a second schematic diagram of a liquid crystal display panel according to an embodiment of the present disclosure.
Figure 5:
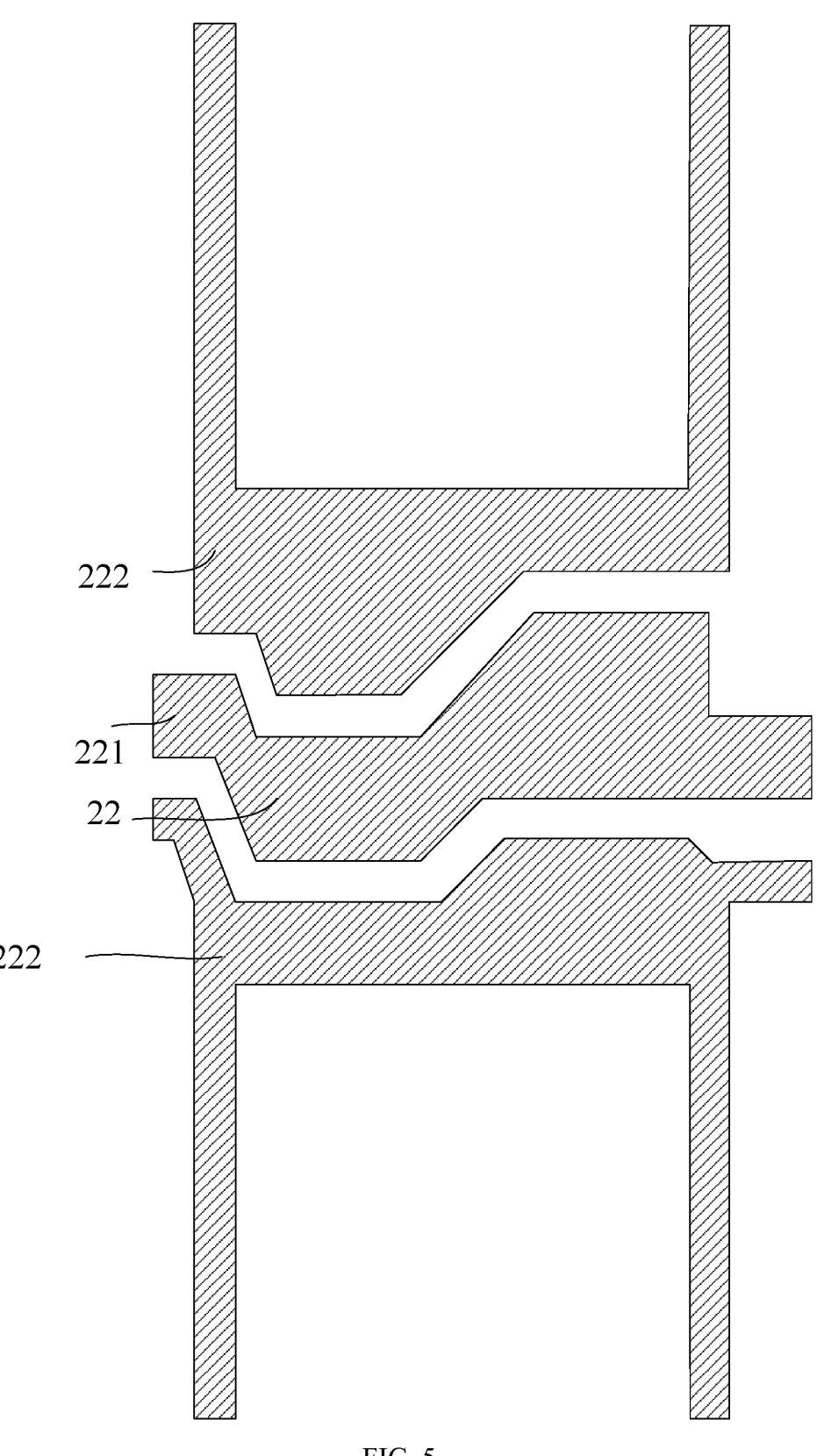
FIG. 5 is an exploded view of a gate layer of the liquid crystal display panel in FIG. 4.
Figure 6:
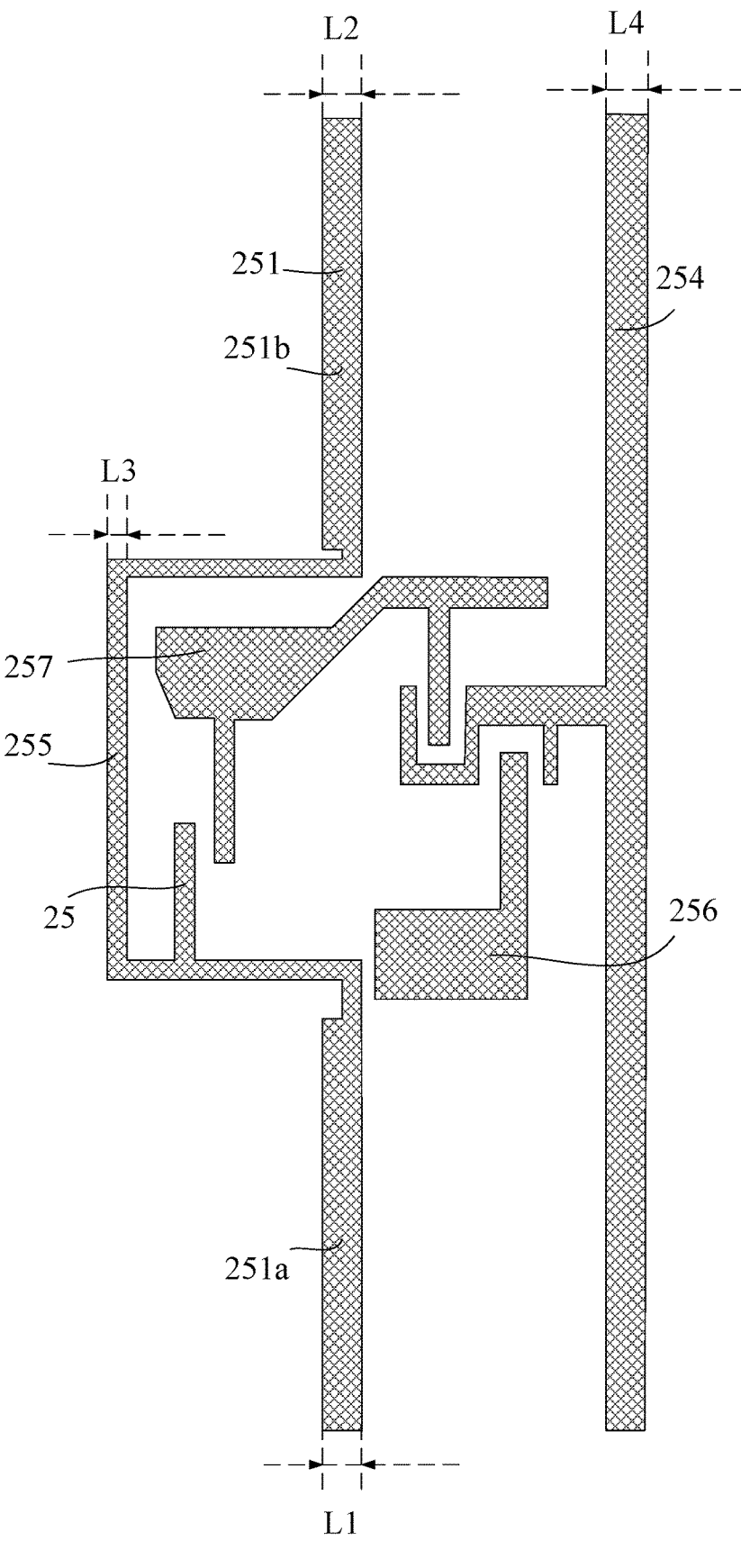
FIG. 6 is an exploded view of source/drain layer of the liquid crystal display panel in FIG. 4.
Figure 7:
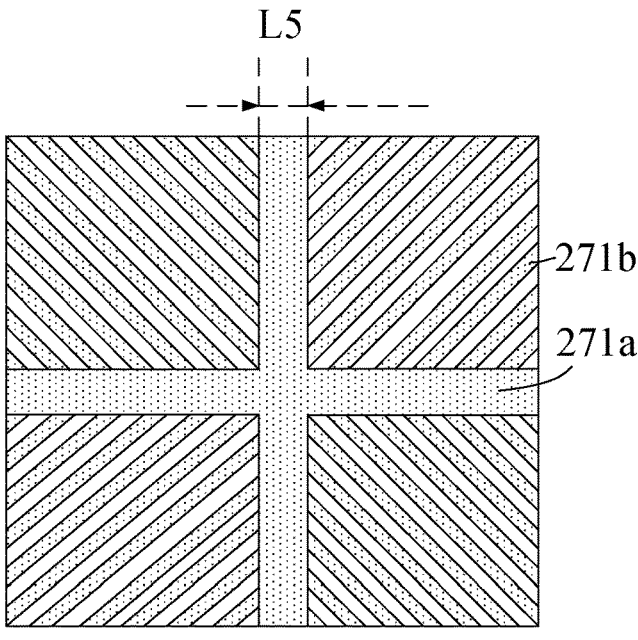
FIG. 7 is an exploded view of a pixel electrode layer of the liquid crystal display panel in FIG. 4.
Figure 7:
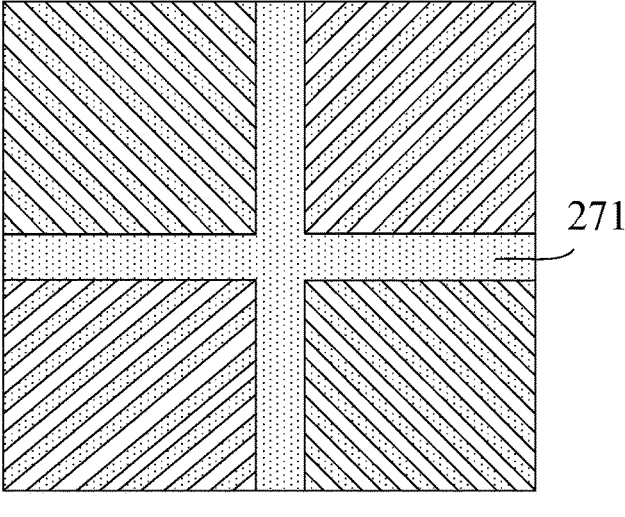

FIG. 2 is a circuit diagram of a liquid crystal display panel according to an embodiment of the present disclosure. FIG. 3 is a first schematic diagram of a liquid crystal display panel according to an embodiment of the present disclosure. FIG. 4 is a second schematic diagram of a liquid crystal display panel according to an embodiment of the present disclosure. FIG. 5 is an exploded view of a gate layer of the liquid crystal display panel in FIG. 4. FIG. 6 is an exploded view of source/drain layer of the liquid crystal display panel in FIG. 4. FIG. 7 is an exploded view of a pixel electrode layer of the liquid crystal display panel in FIG. 4.

As shown in FIGS. 2 to 7, an embodiment of the present disclosure provides a liquid crystal display panel 2 including a plurality of scanning lines 221 and a plurality of data lines 254. The plurality of scanning lines 221 and the plurality of data lines 254 define a plurality of sub-pixel units 30, and at least one of the sub-pixel units 30 connects a scanning line 221 and a data line 254. One sub-pixel unit 30 includes:

a main sub-pixel unit 31 including a first transistor T1;

a secondary sub-pixel unit 32 including a second transistor T2 and a third transistor T3; and a pull-down signal line 251 connected to the third transistor T3.

The liquid crystal display panel 2 further includes a substrate 21 and a gate layer 22. A projection of the pull-down signal line 251 on the substrate 21 is spaced apart from a projection of any wiring in the gate layer 22 on the substrate 21.

An embodiment of the present disclosure provides a liquid crystal display panel, in which a projection of the pull-down signal line on the substrate is spaced apart from a projection of any wiring in the gate layer on the substrate, so that no other metal is placed under the pull-down signal line. When the liquid crystal display panel is manufactured, the thickness of the photoresist on the pull-down signal line is similar to or even equal to that of the photoresist in other areas, which enhances the adhesion of the photoresist on the pull-down signal line and prevents the photoresist on the pull-down signal line from being peeled off, thereby protecting the pull-down signal line, and avoiding disconnection and failure of the pull-down signal line. Moreover, since metals placed under the pull-down signal line are removed, the width of the pull-down signal line can be correspondingly increased, further avoiding the disconnection of the pull-down signal line, reducing the impedance of the pull-down signal line, reducing the power consumption of the liquid crystal display panel, and improving the display uniformity of the liquid crystal display panel.

It should be noted that since the structure of the liquid crystal display panel is shown in the circuit diagram and the film layer diagram, respectively, in embodiments of the present disclosure, there may be cases where different reference numerals are used to describe the same structure in the circuit diagram and the film layer diagram. Specifically, for example, in FIG. 2, the data line is shown with reference numeral "Data", and in FIG. 6, the data line is shown with reference numeral "254". However, it can be understood that the data line "Data" in FIG. 2 and the data line "254" in FIG. 6 are circuit schematic diagram and film schematic diagram of the same structure. Similarly, for other structures, reference may be made to the description of the data lines, which will not be described in the following examples.

It should be noted that in the drawings of embodiments of the present disclosure, each structure is marked. It can be understood that since the interconnected portions are formed at the same time during the process of manufacturing the liquid crystal display panel, there will be no boundary. Therefore, the portions marked with some of the reference numerals may include a plurality of structures. For example, in FIG. 6, the portion marked with reference numeral 254 includes both a first plate of the second storage capacitor Cst2 and a source of the third transistor that is connected with the first plate of the second storage capacitor Cst2. In embodiments of the present disclosure, it is only described by taking the reference numeral 257 as the reference numeral of the first plate of the second storage capacitor Cst2 as an example. Similarly, for other reference numerals, reference may be made to the description of reference numeral 257, and the specific structure thereof are described in the following examples.

It should be noted that a projection of the pull-down signal line on the substrate is spaced apart from a projection of any wiring in the gate layer on the substrate means that the gate layer includes a plurality of wirings, and the projection of the pull-down signal line does not overlap the projection of each wiring in the gate layer on the substrate.

It should be noted that the main sub-pixel unit 31 and the secondary sub-pixel unit 32 are marked in FIG. 4. It can be understood that since each element may overlap or share the same structure, the marked main sub-pixel unit 31 and the marked secondary sub-pixel unit 32 may include other structures. For example, the sources of the first transistor and the second transistor share the same structure, so this structure belongs to both the main sub-pixel unit 31 and the secondary sub-pixel unit 32. For example, the pull-down signal line may overlap with the main sub-pixel unit 31 and the secondary sub-pixel unit 32, so the main sub-pixel unit 31 and the secondary sub-pixel unit 32 marked in FIG. 4 include the pull-down signal line. It can be understood that the specific elements and structures included in the main sub-pixel unit 31 and the secondary sub-pixel unit 32 may be described below.

Specifically, compared with directly increasing the thickness of the photoresist on the pull-down signal line, it is necessary to increase the thickness of the photoresist in other areas at the same time, which will lead to an increase in the line width and a decrease in the line spacing of the signal lines in other areas, and an increase in the risk of short circuit between different signal lines. In the present disclosure, the thickness of the photoresist in other areas will not be increased by removing the metals placed under the pull-down signal line, so that the thickness of the photoresist on the pull-down signal line is similar to or even equal to that of the photoresist in other areas, thus the line width of the signal line in other areas will not be increased, the line spacing will not be decreased, thereby reducing the risk of short-circuit between different signal lines.

Regarding uneven display may be caused by disposing a pull-down signal line on one side of the main sub-pixel unit and the secondary sub-pixel unit. In an embodiment, as shown in FIGS. 2 to 6, the pull-down signal line 251 includes a first portion 251*a* and a second portion 251*b*. One of the first portion 251*a* and the second portion 251*b* corresponds to the main sub-pixel unit 31, the other of the first portion 251*a* and the second portion 251*b* corresponds to the secondary sub-pixel unit 32. The liquid crystal display panel 2 further includes a connection line 255, the first portion 251*a* and the second portion 251*b* are connected by the connection line 255, and the connection line 255 is connected with the third transistor. According to the present disclosure, the first portion 251*a* and the second portion 251*b* are respectively disposed in the corresponding area of the main sub-pixel unit and the corresponding area of the secondary sub-pixel unit, so that the brightness of the main sub-pixel unit and the secondary sub-pixel unit does not meet the requirements due to the uneven setting of the pull-down signal lines, which further causes uneven display, thereby improving display uniformity of the display panel.

Specifically, when connecting the first portion and the second portion, the first portion and the second portion can be connected through a connection line, and the connection line is connected with the third transistor, so that the connection between the pull-down signal line and the third transistor can be realized.

Specifically, the projection of the connection line on the substrate coincides with the projection of the scanning lines on the substrate.

In an embodiment, as shown in FIGS. 2 to 6, the first portion 251*a* is disposed corresponding to the main sub-pixel unit 31, the second portion 251*b* is disposed corresponding to the secondary sub-pixel unit 32, and the width L1 of the first portion 251*a* is greater than the width L2 of the second portion 251*b*. By disposing the width of the first portion greater than that of the second portion, there is a certain voltage difference between the main sub-pixel unit and the sub-pixel unit when adjusting the driving voltages of the main sub-pixel area and the sub-pixel area to avoid color shift, the loads in the main sub-pixel unit and the secondary sub-pixel unit can be changed through the first portion and the second portion, so that the loads in the main sub-pixel unit and the secondary sub-pixel unit are inconsistent, and the load in the main sub-pixel unit is smaller, thereby reducing the voltage difference between the driving voltages of the main sub-pixel unit and the secondary sub-pixel unit, and reducing power consumption.

Specifically, by increasing the width of the first portion corresponding to the main sub-pixel unit, the impedance of the first portion is reduced, and the load of the main sub-pixel unit is reduced, so that the power consumption can be reduced.

Specifically, the above-described embodiments are described by taking an example in which the first portion is disposed corresponding to the main sub-pixel unit, the second portion is disposed corresponding to the secondary sub-pixel unit, and the width of the first part is greater than that of the second portion for illustration. However, embodiments of the present disclosure are not limited thereto. For example, the first portion is disposed corresponding to the main sub-pixel unit, and the second portion is disposed corresponding to the secondary sub-pixel unit, and the width of the first portion is less than that of the second portion.

Regarding high cost caused by the problem of it is necessary to change the width of the pull-down signal line in order to change the photomask of the source/drain layer. In an embodiment, the width of the pull-down signal line is equal to that of the connection line. By making the width of the pull-down signal line equal to that of the connection line, it is not necessary to change the mask when forming the pull-down signal line, thus reducing the cost.

Specifically, for the width of the pull-down signal line, when the widths of each part of the pull-down signal line are equal, the width of the pull-down signal line refers to the width of any part of the pull-down signal line. When the widths of each part of the pull-down signal line are not equal, the width of the pull-down signal line refers to the maximum width of the pull-down signal line, or the width of the pull-down signal line may refer to the minimum width of the pull-down signal line.

Regarding the problem that There may still be disconnectionin view of less width of the pull-down signal line. In an embodiment, as shown in FIG. 6, the width L1 of the first portion 251a is equal to the width L2 of the second portion 251b, and the width of the first portion 251a is greater than the width L3 of the connection line 255. By making the width of the first portion equal to that of the second portion, and the width of the first portion is greater than that of the connection line, the width of the pull-down signal line can be increased to further avoid disconnectionin of the pull-down signal line, and the impedance of the pull-down signal line can be reduced, thereby reducing the power consumption of the liquid crystal display panel.

Specifically, when the width of the first portion is made greater than the width of the connection line, considering that the metals placed under the pull-down signal line is removed in the present disclosure, the thickness of the photoresist located on the pull-down signal line is increased accordingly, and the width of the photoresist located on the pull-down signal line is increased. Accordingly, the width of the pull-down signal line may also be increased when forming the pull-down signal line by etching. Therefore, the width of the pull-down signal line may be increased without changing the mask. However, considering that the width of the pull-down signal line will not increase or the increase amplitude is small without changing the mask, mask in embodiments of the present disclosure can be changed to increase the width of the pull-down signal line.

In an embodiment, as shown in FIG. 6, the width of the pull-down signal line 251 (e.g., the width L1 of the first portion 251a) is equal to the width L4 of the data line 254. By making the width of the pull-down signal line equal to the width of the data line, disconnection of the pull-down signal line is further avoided, and the impedance of the pull-down signal line can also be reduced, thus reducing the power consumption of the liquid crystal display panel.

Regarding the problem that disconnection of the pull-down unit is easily to occur due to less thickness of the photoresist caused by high height at the pull-down unit. In an embodiment, as shown in FIG. 2, the liquid crystal display panel 2 further includes a gate insulating layer 23 disposed on one side of the gate layer 22 away from the substrate 21. The gate insulating layer 23 is in direct contact with the substrate 21 in an area corresponding to the pull-down signal line 251. By directly contacting the gate insulating layer with the substrate, no other metal is placed under the pull-down signal line, so that when the liquid crystal display panel is manufactured, the thickness of photoresist on the pull-down signal line is similar to or even equal to that of the photoresist in other areas, so as to avoid peeling of photoresist and damage to the pull-down signal line, and the width of photoresist on the pull-down signal line is large, thereby increasing the width of the pull-down signal line, avoiding disconnection of the pull-down signal line and improving yield of the liquid crystal display panel.

Specifically, in the corresponding area of the pull-down signal line in embodiments of the present disclosure, direct contact between the gate insulating layer and the substrate is taken as an example. However, embodiments of the present disclosure are not limited thereto. For example, if the buffer layer and the barrier layer are provided on the substrate, the gate insulating layer may be in direct contact with the buffer layer or the barrier layer.

In view of the problem that increasing the width of the pull-down signal line may result in a decrease in the opening rate of the liquid crystal display panel. In an embodiment, as shown in FIGS. 3 to 6, the liquid crystal display panel 2 further includes:

a source/drain layer 25 disposed on one side of the gate insulating layer 23 away from the substrate 21, wherein the source/drain layer 25 includes a pull-down signal line 251; and a pixel electrode layer 27 disposed on one side of the source/drain layer 25 away from the gate insulating layer 23, wherein the pixel electrode layer 27 includes a pixel electrode 271.

Each of the plurality of pixel electrode 271 includes a main trunk electrode 271a and a plurality of branch electrodes 271b, the projection of the pull-down signal line 251 on the substrate 21 coincides with the projection of the main trunk electrode 271a on the substrate 21, and the width (for example, the width L1 of the first portion 251a) of the pull-down signal line 251 is less than or equal to the width L5 of the main trunk electrode 271a. By disposing the pull-down signal line in correspondence with the main trunk electrode in the pixel electrode and making the width of the pull-down signal line less than or equal to the width of the main trunk electrode, decrease of the opening rate of the liquid crystal display panel caused by increasing the width of the pull-down signal line can be avoided.

Specifically, as shown in FIG. 7, the main trunk electrode 271a includes a horizontally main disposed trunk electrode and a vertically disposed main trunk electrode. The projection of the main trunk electrode on the substrate includes the projection of the horizontally main disposed trunk electrode on the substrate and the projection of the vertically disposed main trunk electrode on the substrate.

Specifically, as shown in FIG. 4, FIG. 6, and FIG. 7, it can be seen that the projection of the pull-down signal line 251 coincides with the projection of the main trunk electrode 271a on the substrate, and the width of the pull-down signal line 251 is equal to the width L5 of the main trunk electrode 271a, so that the pull-down signal line can be hidden under the main trunk electrode, thereby avoiding the pull-down signal line from occupying the area of the light-emitting area, and improving the opening rate of the liquid crystal display panel. In addition, the width of the pull-down signal line is increases, which further reduces the risk of disconnection of the pull-down signal line, improves the yield of the liquid crystal display panel, reduces the impedance of the pull-down signal line, and reduces the power consumption of the liquid crystal display panel.

Specifically, the above-mentioned embodiments have been described by taking the width of the pull-down signal line less than or equal to that of the main trunk electrode as an example, but embodiments of the present disclosure are not limited thereto. For example, in the existing liquid crystal display devices, a common wiring may be disposed in an area corresponding to the main trunk electrode, and the width of the common wiring may be greater than that of the main trunk electrode. However, in the present disclosure, a common wiring is not disposed in the area corresponding to the main trunk electrode, so that the width of the pull-down signal line may be greater than that of the main trunk electrode, and the effect of increasing the opening rate of the liquid crystal display panel may still be achieved is cases that the width of the pull-down signal line is less than or equal to that of the common wiring. The width of the pull-down signal line is further increased, which further reduces the risk of disconnection of the pull-down signal line, increases the yield of the liquid crystal display panel, further reduces the impedance of the pull-down signal line, and reduces the power consumption of the liquid crystal display panel.

Specifically, as shown in FIG. 2, the source/drain layer 25 further includes a source electrode 252 and a drain electrode 253.

Specifically, embodiments of the present disclosure are described by taking the sub-pixel unit as an eight-domain design as an example, but embodiments of the present disclosure are not limited thereto. For example, the sub-pixel unit may be a two-domain design or a four-domain design.

In an embodiment, as shown in FIGS. 2 to 6, the main sub-pixel unit 31 further includes a first storage capacitor Cst1, and the secondary sub-pixel unit 32 further includes a second storage capacitor Cst2. A first plate 256 of the first storage capacitor Cst1 is connected with the first transistor T1, a second plate of the first storage capacitor Cst1 is connected with the common signal line 222, a first plate 257 of the second storage capacitor Cst2 is connected with the third transistor T3, and a second plate of the second storage capacitor Cst2 is connected with the common signal line 222. By connecting the second plate of the first storage capacitor with the common signal line, and connecting the second plate of the second storage capacitor with the common signal line, the first storage capacitor and the second storage capacitor can work normally after removing the metals placed under the pull-down signal line, so that the liquid crystal display panel can work normally.

Specifically, as shown in FIG. 2, the second plate of the first storage capacitor Cst1 is connected with the common signal line Acom, and the second plate of the second storage capacitor Cst1 is connected with the common signal line Acom.

In an embodiment, as shown in FIGS. 2 to 6, the gates of the first transistor T1, the second transistor T2, and the third transistor T3 are connected with the scanning line Scan; the first electrode of the first transistor T1 and the first electrode of the second transistor T2 are connected with the data line Data; the second electrode of the first transistor T1 is connected with the first storage capacitor Cst1; the second electrode of the second transistor T2 is connected with the first electrode of the third transistor T3; and the second electrode of the third transistor T3 is connected with the pull-down signal line 251. By connecting the first electrode of the third transistor with the second transistor, and connecting the second electrode of the third transistor with the pull-down signal line, the pull-down signal line can pull down the voltage of the secondary sub-pixel unit, so that there is a voltage difference between the main sub-pixel unit and the secondary sub-pixel unit, thereby improving the color shift problem of the liquid crystal display panel.

In an embodiment, as shown in FIG. 2, the main sub-pixel unit 31 further includes a first liquid crystal capacitor Clc1.

The secondary sub-pixel unit 32 further includes a second liquid crystal capacitor Clc2. The first plate of the first liquid crystal capacitor Clc1 is connected with the second electrode of the first transistor T1. The second plate of the first liquid crystal capacitor Clc1 is connected with the common electrode line Ccom. The first plate of the second liquid crystal capacitor Clc2 is connected with the second electrode of the second transistor T2. The second plate of the second liquid crystal capacitor Clc2 is connected with the common electrode line Ccom.

Specifically, as shown in FIG. 3, the liquid crystal display panel 2 further includes an active layer 24 disposed between the source/drain layer 25 and the gate insulating layer 23.

Specifically, as shown in FIG. 3, the liquid crystal display panel 2 further includes a planarization layer 26 disposed between the pixel electrode layer 27 and the source/drain layer 25.

In an embodiment, the liquid crystal display panel further includes a color resist layer and a passivation layer, wherein the passivation layer is disposed between the source/drain layer and the planarization layer, and the color resist layer is disposed between the passivation layer and the planarization layer.

In an embodiment, the liquid crystal display panel further includes a liquid crystal layer, a common electrode layer, and a color resist layer. The common electrode layer is disposed on one side of the liquid crystal layer away from the pixel electrode layer. The color resist layer is disposed on one side of the common electrode layer away from the liquid crystal layer.

Specifically, the above embodiments explain the design of the liquid crystal display panel from different directions. It can be understood that the embodiments can be combined in order to achieve better technical effects is case there is no conflict between the embodiments. For example, the width of the pull-down signal line is equal to the width of the data line. The liquid crystal display panel further includes a gate insulating layer, which is disposed on the side of the gate layer away from the substrate, and the gate insulating layer is in direct contact with the substrate in an area corresponding to the pull-down signal line.

Meanwhile, embodiments of the present disclosure provide a method for manufacturing a liquid crystal display panel according to any one of the above embodiments.

Specifically, as shown in FIG. 8, the method for manufacturing a liquid crystal display panel includes:

S1, providing a substrate;

S2, forming a gate layer on the substrate;

S3, sequentially forming a semiconductor layer and a metal layer on the gate layer;

S4, forming a photoresist layer on the metal layer, and patterning the photoresist layer; wherein a thickness of a portion of the photoresist layer disposed on the pull-down signal line is equal to that of a portion of the photoresist layer disposed on the data line;

S5, performing wet etching on the semiconductor layer and the metal layer to form an active layer and a source/drain layer; and S6, removing the photoresist to obtain a liquid crystal display panel.

An embodiment of the present disclosure provides a method for manufacturing a liquid crystal display panel, in which a photoresist is formed on a metal layer, so that a portion of the photoresist layer disposed on a pull-down signal line is equal to that of a portion of the photoresist layer disposed on a data line. When the photoresist is patterned, a width of the photoresist disposed on the pull-down signal line is equal to that of the photoresist disposed on the data line, and a thickness of the photoresist layer disposed on the pull-down signal line is equal to that of the photoresist disposed on the data line, thereby reducing a risk of peeling of the photoresist, protecting the pull-down signal line, and avoiding disconnection and failure of the pull-down signal line. Further, the width of the drop down signal line can be increased, which can further avoid disconnection of the pull-down signal line, and reduce the impedance of the pull-down signal line, thereby reducing power consumption of the liquid crystal display panel, and improving display uniformity of the liquid crystal display panel.

In an embodiment, the width of a portion of the photoresist layer extending beyond the pull-down signal line ranges from 2 microns to 4 microns.

In an embodiment, the thickness of the photoresist layer ranges from 0.5 microns to 1.5 microns, and the thickness of the portion of the photoresist layer disposed on the pull-down signal line ranges from 0.5 microns to 1.5 microns.

In an embodiment, the width of the portion of the photoresist layer disposed on the pull-down signal line ranges from 4 microns to 10 microns.

Specifically, after the step of removing the photoresist to obtain the liquid crystal display panel, the method further includes steps of forming a passivation layer on the source/drain layer, forming a color resist layer on the passivation layer, forming a planarization layer on the color resist layer, and forming a pixel electrode layer on the planarization layer.

Meanwhile, embodiments of the present disclosure provides a liquid crystal display device including the liquid crystal display panel according to any one of the above embodiments.

Specifically, as shown in FIG. 9, the liquid crystal display device further includes a backlight module 41.

It can be seen from the above embodiments that:

Embodiments of the present disclosure provide a liquid crystal display panel, a manufacturing method thereof, and a liquid crystal display device. The liquid crystal display panel includes a plurality of scanning lines and a plurality of data lines. The plurality of scanning lines and the plurality of data lines define a plurality of sub-pixel units, and at least one sub-pixel unit is connected with one scanning line and one data line. The sub-pixel unit includes a main sub-pixel unit, a secondary sub-pixel unit and a pull-down signal line. The main sub-pixel unit includes a first transistor. The secondary sub-pixel unit includes a second transistor and a third transistor. The pull-down signal line is connected with the third transistor. The liquid crystal display panel further includes a substrate and a gate layer, and a projection of the pull-down signal line on the substrate is spaced apart from a projection of any wiring in the gate layer on the substrate. In the present disclosure, a projection of the pull-down signal line on the substrate is spaced apart from a projection of any wiring in the gate layer on the substrate, so that no other metal is placed under the pull-down signal line. When the liquid crystal display panel is manufactured, the thickness of the photoresist on the pull-down signal line is similar to or even equal to that of the photoresist in other areas, which enhances the adhesion of the photoresist on the pull-down signal line and prevents the photoresist on the pull-down signal line from being peeled off, thereby protecting the pull-down signal line, and avoiding disconnection and failure of the pull-down signal line. Moreover, since metals placed under the pull-down signal line are removed, the width of the pull-down signal line can be correspondingly increased, further avoiding the disconnection of the pull-down signal line, reducing the impedance of the pull-down signal line, reducing the power consumption of the liquid crystal display panel, and improving the display uniformity of the liquid crystal display panel.

In the above embodiments, the description of each embodiment has its own emphasis. For a part that is not detailed in an embodiment, please refer to the related descriptions of other embodiments.

The above provides a detailed introduction to a liquid crystal display panel, a manufacturing method thereof, and a liquid crystal display device according to embodiments of the present disclosure. Specific examples are used in this text to illustrate the principles and implementations of the present disclosure. The description of the above embodiments is only used to help understanding the technical solutions of the present disclosure and its core ideas. Those of ordinary skill in the art should understand that: they can still modify the technical solutions recorded in the foregoing embodiments, or equivalently replace some of the technical features; and these modifications or replacements do not cause the essence of the corresponding technical solutions to deviate from the scope of the technical solutions of the embodiments of the present disclosure.

What is claimed is:

1. A liquid crystal display panel, comprising a plurality of scanning lines and a plurality of data lines, the plurality of scanning lines and the plurality of data lines defining a plurality of sub-pixel units, at least one of the sub-pixel units connecting one of the plurality of scanning lines and one of the plurality of data lines, and each of the sub-pixel units comprising:

a main sub-pixel unit comprising a first transistor;

a secondary sub-pixel unit comprising a second transistor and a third transistor; and a pull-down signal line connected to the third transistor;

wherein the liquid crystal display panel further comprises a substrate and a gate layer, and a projection of the pull-down signal line on the substrate is spaced apart from a projection of any wiring in the gate layer on the substrate;

wherein a width of the pull-down signal line is equal to that of the data line.

2. The liquid crystal display panel according to claim 1, wherein the pull-down signal line comprises a first portion and a second portion, one of the first portion and the second portion is disposed corresponding to the main sub-pixel unit, another of the first portion and the second portion is disposed corresponding to the secondary sub-pixel unit, the liquid crystal display panel further comprises a connection line, the first portion and the second portion are connected by the connection line, and the connection line is connected with the third transistor.

3. The liquid crystal display panel according to claim 2, wherein the first portion is disposed corresponding to the main sub-pixel unit, the second portion is disposed corresponding to the secondary sub-pixel unit, and a width of the first portion is greater than that of the second portion.

4. The liquid crystal display panel according to claim 2, wherein a width of the first portion is equal to that of the second portion, and the width of the first portion is greater than or equal to a width of the connection line.

5. The liquid crystal display panel according to claim 1, further comprising a gate insulating layer disposed on one side of the gate layer away from the substrate, wherein the gate insulating layer is in direct contact with the substrate in an area corresponding to the pull-down signal line.

6. The liquid crystal display panel according to claim 5, further comprising:

a source/drain layer disposed on the side of the gate insulating layer away from the substrate, the source/drain layer comprising a pull-down signal line; and a pixel electrode layer disposed on one side of the source/drain layer away from the gate insulating layer, the pixel electrode layer comprising a plurality of pixel electrodes;

wherein each of the plurality of pixel electrode comprises a main trunk electrode and a plurality of branch electrodes, the projection of the pull-down signal line on the substrate coincides with the projection of the main trunk electrode on the substrate, and the width of the pull-down signal line is less than or equal to that of the main trunk electrode.

7. The liquid crystal display panel according to claim 1, wherein the main sub-pixel unit further comprises a first storage capacitor, the secondary sub-pixel unit further comprises a second storage capacitor, a first plate of the first storage capacitor is connected with the second transistor, a second plate of the first storage capacitor is connected with a common signal line, a first plate of the second storage capacitor is connected with the third transistor, and a second plate of the second storage capacitor is connected with the common signal line.

8. The liquid crystal display panel according to claim 7, wherein gates of the first transistor, the second transistor, and the third transistor are connected with the plurality of scanning lines, a first electrode of the first transistor and a first electrode of the second transistor are connected with the plurality of data lines, a second electrode of the first transistor is connected with the first storage capacitor, a second electrode of the second transistor is connected with a first electrode of the third transistor, and a second electrode of the third transistor is connected with the pull-down signal line.

9. The liquid crystal display panel according to claim 8, wherein the main sub-pixel unit further comprises a first liquid crystal capacitor, the secondary sub-pixel unit further comprises a second liquid crystal capacitor, a first plate of the first liquid crystal capacitor is connected with a second electrode of the first transistor, a second plate of the first liquid crystal capacitor is connected with a common electrode line, a first plate of the second liquid crystal capacitor is connected with a second electrode of the second transistor, and a second plate of the second liquid crystal capacitor is connected with the common electrode line.

10. A method for manufacturing a liquid crystal display panel, wherein the liquid crystal display panel of claim 1 is prepared by the method, the method comprises:

providing a substrate;

forming a gate layer on the substrate;

sequentially forming a semiconductor layer and a metal layer on the gate layer;

forming a photoresist layer on the metal layer, and patterning the photoresist layer; a thickness of a portion of the photoresist layer disposed on the pull-down signal line being equal to that of a portion of the photoresist layer disposed on the data line;

performing wet etching on the semiconductor layer and the metal layer to form an active layer and a source/drain layer; and removing the photoresist to obtain a liquid crystal display panel.

11. A liquid crystal display device, wherein the liquid crystal display device comprising a liquid crystal display panel, the liquid crystal display panel comprising a plurality of scanning lines and a plurality of data lines, the plurality of scanning lines and the plurality of data lines defining a plurality of sub-pixel units, at least one of the sub-pixel units connecting one of the plurality of scanning lines and one of the plurality of data lines, and each of the sub-pixel units comprising:

a main sub-pixel unit comprising a first transistor;

a secondary sub-pixel unit comprising a second transistor and a third transistor; and a pull-down signal line connected to the third transistor;

wherein the liquid crystal display panel further comprises a substrate and a gate layer, and a projection of the pull-down signal line on the substrate is spaced apart from a projection of any wiring in the gate layer on the substrate;

wherein a width of the pull-down signal line is equal to that of the data line.

12. The liquid crystal display device according to claim 11, wherein the pull-down signal line comprises a first portion and a second portion, one of the first portion and the second portion is disposed corresponding to the main sub-pixel unit, another of the first portion and the second portion is disposed corresponding to the secondary sub-pixel unit, the liquid crystal display panel further comprises a connection line, the first portion and the second portion are connected by the connection line, and the connection line is connected with the third transistor.

13. The liquid crystal display device according to claim 12, wherein the first portion is disposed corresponding to the main sub-pixel unit, the second portion is disposed corresponding to the secondary sub-pixel unit, and a width of the first portion is greater than that of the second portion.

14. The liquid crystal display device according to claim 12, wherein a width of the first portion is equal to that of the second portion, and the width of the first portion is greater than or equal to a width of the connection line.

15. The liquid crystal display device according to claim 11, wherein the liquid crystal display panel further comprises a gate insulating layer disposed on one side of the gate layer away from the substrate, and the gate insulating layer is in direct contact with the substrate in an area corresponding to the pull-down signal line.

16. The liquid crystal display device according to claim 15, wherein the liquid crystal display panel further comprises:

a source/drain layer disposed on the side of the gate insulating layer away from the substrate, the source/drain layer comprising a pull-down signal line; and a pixel electrode layer disposed on one side of the source/drain layer away from the gate insulating layer, the pixel electrode layer comprising a plurality of pixel electrodes;

wherein each of the plurality of pixel electrode comprises a main trunk electrode and a plurality of branch electrodes, the projection of the pull-down signal line on the substrate coincides with the projection of the main trunk electrode on the substrate, and the width of the pull-down signal line is less than or equal to that of the main trunk electrode.

17. The liquid crystal display device according to claim 11, wherein the main sub-pixel unit further comprises a first storage capacitor, the secondary sub-pixel unit further comprises a second storage capacitor, a first plate of the first storage capacitor is connected with the second transistor, a second plate of the first storage capacitor is connected with a common signal line, a first plate of the second storage capacitor is connected with the third transistor, and a second plate of the second storage capacitor is connected with the common signal line.

18. The liquid crystal display device according to claim 17, wherein gates of the first transistor, the second transistor, and the third transistor are connected with the plurality of scanning lines, a first electrode of the first transistor and a first electrode of the second transistor are connected with the plurality of data lines, a second electrode of the first transistor is connected with the first storage capacitor, a second electrode of the second transistor is connected with a first electrode of the third transistor, and a second electrode of the third transistor is connected with the pull-down signal line.

19. A liquid crystal display panel, comprising a plurality of scanning lines and a plurality of data lines, the plurality of scanning lines and the plurality of data lines defining a plurality of sub-pixel units, at least one of the sub-pixel units connecting one of the plurality of scanning lines and one of the plurality of data lines, and each of the sub-pixel units comprising:

a main sub-pixel unit comprising a first transistor;

a secondary sub-pixel unit comprising a second transistor and a third transistor; and a pull-down signal line connected to the third transistor;

wherein the liquid crystal display panel further comprises a substrate and a gate layer, and a projection of the pull-down signal line on the substrate is spaced apart from a projection of any wiring in the gate layer on the substrate; and wherein the pull-down signal line comprises a first portion and a second portion, the first portion is disposed corresponding to the main sub-pixel unit, the second portion is disposed corresponding to the secondary sub-pixel unit, and a width of the first portion is greater than that of the second portion.

20. The liquid crystal display panel according to claim 19, further comprising a gate insulating layer disposed on one side of the gate layer away from the substrate, wherein the gate insulating layer is in direct contact with the substrate in an area corresponding to the pull-down signal line.

* * * * *